United States Patent [19]

Heyn

[11] 4,096,920

[45] Jun. 27, 1978

[54] POWERED SHOPPING CART AND TRAILER

[76] Inventor: Bennington Heyn, 1009 Alexander Ave., Ridgefield, N.J. 07657

[21] Appl. No.: 755,789

[22] Filed: Dec. 30, 1976

[51] Int. Cl.² .......................................... B62D 59/04
[52] U.S. Cl. ................................. 180/11; 180/14 R; 280/DIG. 4
[58] Field of Search ............... 180/11, 13, 14 R, 14 E, 180/15; 280/32.7, DIG. 4, DIG. 5

[56] References Cited

U.S. PATENT DOCUMENTS

| | | | |
|---|---|---|---|
| 3,485,314 | 12/1969 | Herr | 180/11 |
| 3,575,250 | 12/1968 | Dykes | 180/11 |
| 3,891,043 | 6/1975 | Valdex | 180/13 |

FOREIGN PATENT DOCUMENTS 661,981  11/1951  United Kingdom ......... 280/DIG. 4

*Primary Examiner*—Kenneth H. Betts
*Assistant Examiner*—Donn McGiehan
*Attorney, Agent, or Firm*—Donald R. Heiner

[57] ABSTRACT

A self-propelled shopping cart, having a trailer accommodation for transporting a passenger behind the cart, and further comprising a brake feature wherein a tilting trailer is used for automatic drive and brake control. An operator can tilt the trailer to the rear to apply a brake means or forward to engage a drive means. A basket of the cart can be removed and replaced by a seat and back rest through the use of a quick release cam locking device and the trailer can be placed in an upright, stowed position so that the cart may be used in the conventional manual push mode.

5 Claims, 6 Drawing Figures

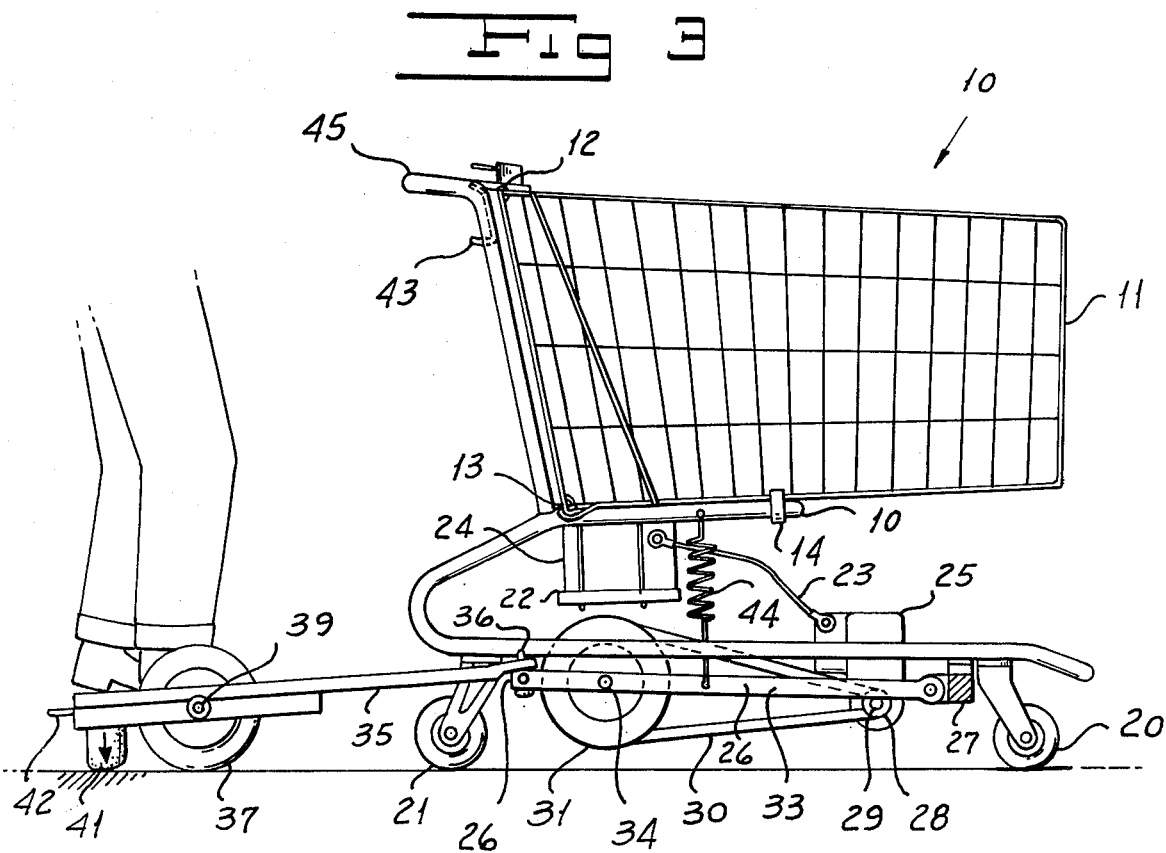

POWERED SHOPPING CART AND TRAILER

BACKGROUND OF THE INVENTION

The present invention relates generally to the field of shopping carts and more particularly to the field of powered, self-propelled shopping carts having a trailer for transporting a passenger wherein the trailer forms the braking means and the self-propelled power engaging means. The device comprises a quick-disconnect device wherein the basket of the shopping cart can be readily removed and replaced by a seat and back rest. By further providing side rails, foot rest, and a seat belt, a passenger may be transported rather than a dead load in the cart. An operator, standing on the trailer, can tilt the trailer to the rear to apply a brake means or forward to engage a drive means. The cart can be used in the conventional mode when the trailer is placed in an upright, stowed position, and manually pushed. Any conventional means, such as an electric motor, gasoline engine, propane engine, etc., may be used as the source of power. The instant invention provides a safe, efficient, economical means of transporting both a passenger and a load such as groceries, books, parts in an assembly plant, etc. and offers several advantages over manual shopping carts now in use and over other powered carts now known as will become clear upon reading the description.

PRIOR ART

The most pertinent prior art patents uncovered during the search appear to be the patents to Swinny, U.S. Pat. Nos. 3,190,386; Swanson et al., 3,190,672; Herr, 3,485,314; and Dykes, 3,575,250.

The patent to Herr, U.S. Pat. No. 3,485,314, represents one of the closest overall teachings to the disclosed concept. However, it is noted that this reference does not teach the use of a shopping cart, a removable basket and, more importantly, the concept of an operator being able to tilt the trailer rearwardly or forwardly to engage a break or drive means.

The patent to Dykes is of interest only in that it generally shows the combination of a shopping cart and self-propelled electric vehicle. As in the Herr patent it does not teach the use of a removable basket or the concept of an operator being able to tilt the trailer rearwardly or forwardly to engage a break or drive means.

The patent to Swinny, U.S. Pat. No. 3,190,386, discloses a self-propelled shopping cart arrangement but fails to teach the trailer means or removable cart of the instant invention.

The patent to Swanson, et al., U.S. Pat. No. 3,190,672, is of interest only in that is discloses a trailer attachment for a floor scrubbing machine. It does not teach a tilt-type trailer on the shopping cart of the instant invention.

SUMMARY OF THE INVENTION

Thus, the present invention relates to an effective, efficient, economical and safe means for transportating a passenger and load employing a standard shopping cart, a tiltable trailer behind the shopping cart which, in addition to functioning as a means for transporting a passenger, serves as a braking means and self-propelled power engaging means, means for stowing the trailer in an upright position so that the cart may be used in the conventional manual push mode and, a quick release cam whereby the basket can be removed and replaced by a seat and back rest for transporting a passenger. It can readily be seen that the self-propelled shopping cart may be used to transport groceries in a shopping center parking lot, for returning books to shelves in a library, for moving parts around a factory floor and many other uses.

Accordingly, it is an object of this invention to provide a self-propelled shopping cart.

Another object of this invention is to provide a self-propelled shopping cart having a tiltable trailer.

Another object of this invention is to provide a self-propelled shopping cart having a tiltable trailer which functions as a brake engaging and power engaging means.

Another object of this invention is to provide a self-propelled shopping cart wherein the basket is removable and replaceable by a seat for a passenger.

Another object of this invention is to provide a self-propelled shopping cart powered by an electric motor or gasoline engine or a propane engine.

These and other objects and advantages of the invention are believed made clear by the following description thereof taken in conjunction with the accompanying drawing wherein:

IN THE DRAWING

FIG. 3 is a side elevation of the powered shopping cart substantially the same as FIG. 1 but showing the rider moved rearwardly thereby actuating the brake means.

FIG. 4 is a side elevation showing the basket removed and replaced by a seat and foot rest and rails.

FIG. 5 is a blown up view of a quick release cam locking device for holding the removable basket in place.

FIG. 6 is a view of the cam locking device taken on line 6—6 of FIG. 5.

Figure 1:
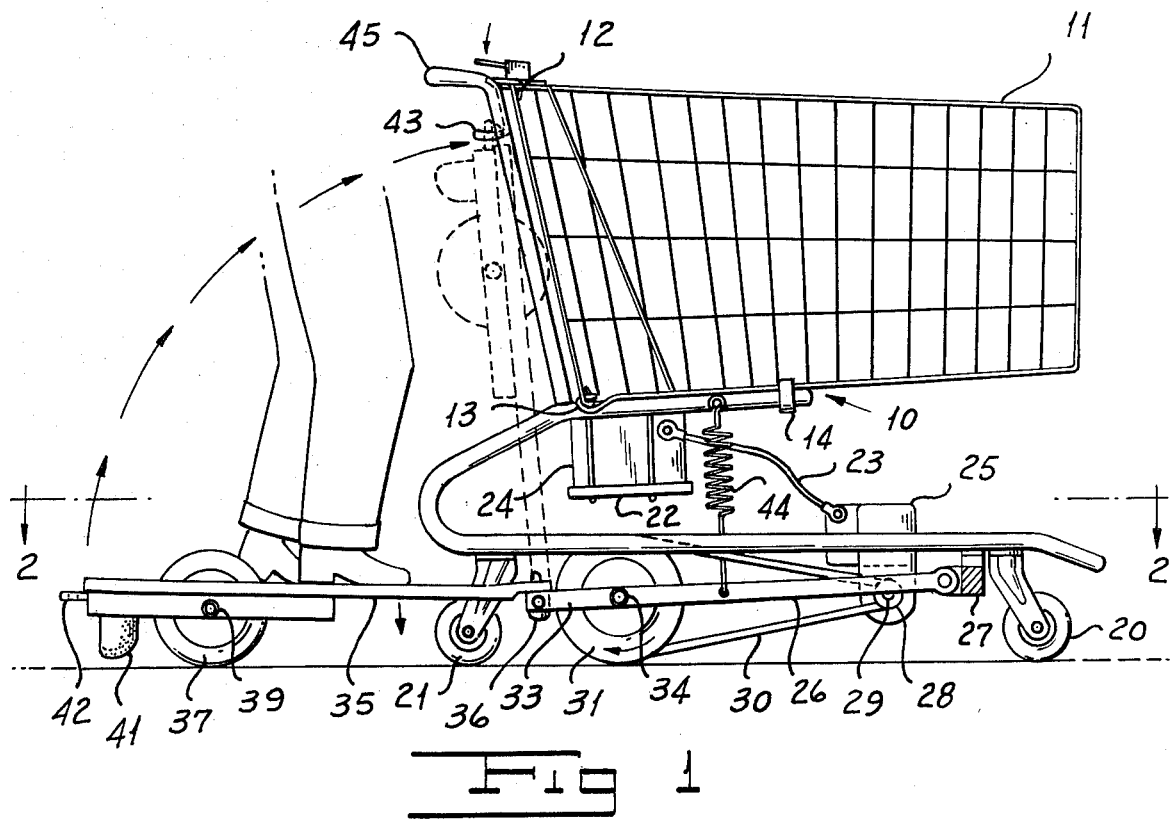
FIG. 1 is a side elevation of the powered shopping cart showing the rider on the trailer and indicating the stowed position of the trailer by the dotted lines.

Referring now to the drawings, the self-propelled shopping cart and trailer comprises a basically standard shopping cart basket frame 10 having a removable basket 11 secured thereto by means of four slide in locks shown as 12 and 13 and two pressed steel bands 14. A quick release cam locking device shown as 15 in FIG. 4, 5 and 6 can be substituted for the pressed steel bands 14 to provide quick removal of the basket 11 when it is desired to replace it with the seat 16, side rails 17, foot rest 18, and motor cover 19 as shown in FIG. 4. The frame 10 has secured thereto two swivable or casterable front wheels 20 engaging the ground and two rear wheels 21 also engaging the ground as is already well known in the art. A battery holder 22 extends below the frame 10 and a battery cable 23 connects a battery 24 to a motor 25 for powering the device as will be more fully explained below. It must be emphasized at this point that any conventional power or drive means such as a gasoline or propane engine (not shown) may be used in place of the battery operated motor disclosed to provide the power to propel the cart.

The motor 25 is secured by any suitable means to the front end of a tiltable trailer 26 which in turn is attached to the basket frame 10 such as by attachment blocks 27. A pulley 28, attached to motor shaft 29, carries a belt 30, which in turn drives two drive wheels 31 and 32 as is conventional and well known in the art. The drive wheels 31 and 32 are rotatably mounted to a frame 33 of trailer 26 by means of an axle 34 and when the drive wheels engage the ground and the power or drive means is actuated, the belt 30 will cause the drive wheels 31 and 32 to rotate thereby propelling the cart and trailer along the ground.

The tiltable trailer shown generally at 26 comprises, besides the drive means 25, drive wheels 31 and 32, frame 33, and axle 34, a pivotable passenger carrying platform 35, pivotable about a vertical pivot point 36.

This platform 35 comprises two rotatable ground engaging wheels 37 and 38 rotatably mounted on axles 39 and 40, a rubber friction break 41 connected to the end of the platform 35 distant from the cart, and an eye 42 connected to the edge of the platform distant from the cart which engages a hook 43 on frame 10 when it is desirous of stowing the platform in an upright position for manual push mode operation of the cart. Further, a pair of springs 44 are operatively associated at one end with basket frame 10 and at their other end with frame 33 of the tiltable trailer 26. The springs function to urge the frame and therefore the drive wheels 31 and 32 up and out of engagement with the ground thereby effectively stopping the power drive means when a passenger, standing on the platform 35, shifts his weight rearwardly. This same motion of the passenger rearwardly causes the platform 35 to tilt rearwardly thereby engaging friction brake 41 with the ground. This combination of the drive wheels being lifted off the ground and the friction brake engaging the ground will stop the cart and trailers forward motion. When the passenger shifts his weight forward on platform 35, as shown in FIG. 1, tension is put on springs 44, drive wheels 31 and 32 are urged in to engagement with the ground, and the rubber friction brake 41 is lifted off the ground. With the drive means, such as motor 25, now actuated, the cart is powered and can move in forward direction.

Figure 2:
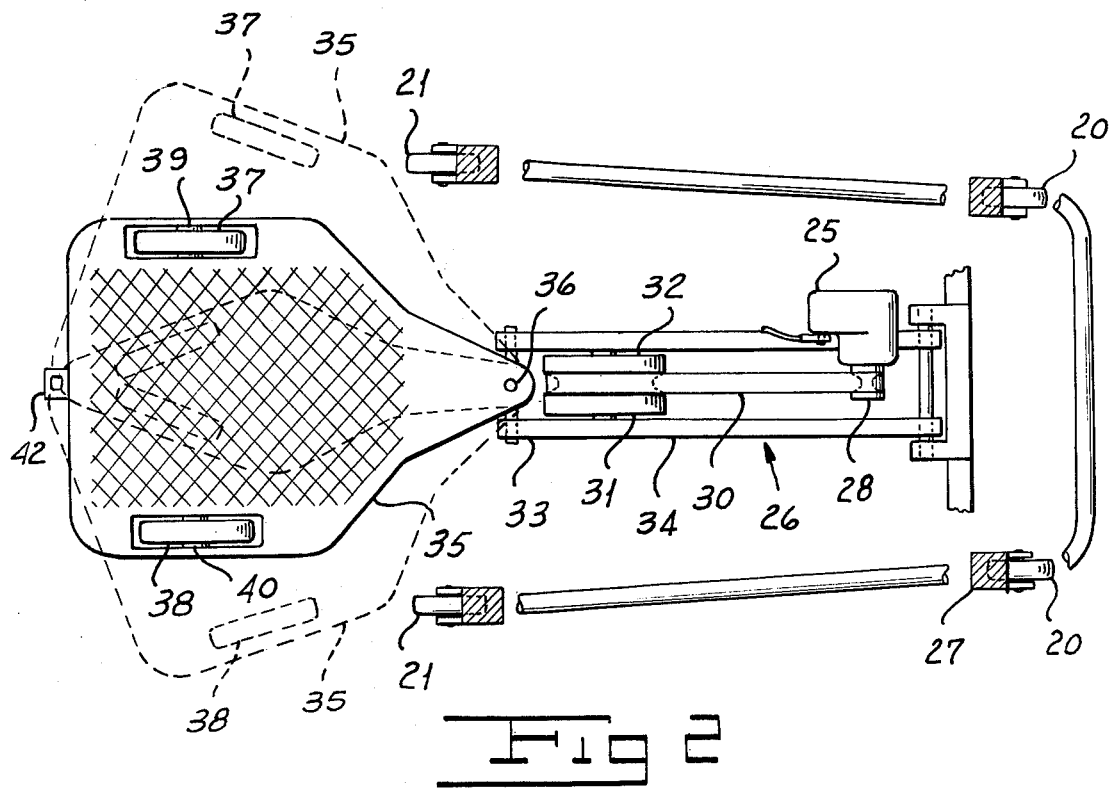
FIG. 2 is a top plan view taken on line 2—2 of FIG. 1 showing the movement of the trailer by the dotted lines.

As previously indicated, the trailer is allowed to pivot from side to side, as shown in FIG. 2, about a vertical pivot point 36. This action, combined with the two swivable or casterable front wheels 20, and the position of the drive wheels 31 and 32 on the center line of the trailer 26, provides for easy steering of the cart and trailer assembly by means of a manual push bar 45 which forms a part of the shopping cart basket frame 10.

OPERATION

In operation, when it is desired to push the cart manually, the trailer is rotated approximately 90° upwardly and the eye 42 engages hook 43 on frame 10 thereby stowing the trailer. The operator then pushes on bar 45 and propels the cart in the conventional manner. When it is desired to power the cart, the trailer is lowered until wheels 37 and 38 engage the ground. An operator stands on the platform near the front end thereof, thereby engaging the drive wheels 31 and 32 with the ground and causing the friction brake 41 to disengage the ground. The operator starts the power means, such as motor 25, and pushes on the push bar 45 causing the cart and trailer combination to be moved along the ground and steered. When the operator wishes to stop the cart and trailer combination, he shifts his weight to the rear of the trailer thereby causing the drive wheels 31 and 32 to disengage the ground, with the aid of the springs 44 urging the frame 33 of the tiltable trailer 26 up toward basket frame 10, and causing friction brake 41 to engage the ground. With the drive wheels disengaged from the ground and the brake engaging the ground, the operator can either leave the power means on or turn it off. If the operator steps off the cart, the brake still engages the ground and the cart will not roll.

Thus, what has been disclosed is a combination powered shopping cart and trailer wherein the combination can either be moved manually or power driven and wherein the trailer functions, besides as a passenger carrying means, as a drive wheel and brake engaging means by the weight shift of the passenger. Further, the shopping cart has a removable basket which can be replaced with a seat, back rest, side rails, front rest and seat belt for transporting an additional passenger.

It will be understood that the invention is not to be limited to the specific construction or arrangement of the parts shown and that they may be modified widely within the invention defined by the claims.

What is claimed is:

1. A shopping cart-trailer vehicle for operation either by a riding passenger or walking operator, comprising:
   (a) A shopping cart basket frame;
   (b) A basket removably attached to said basket frame for causing a load to be transported;
   (c) a pair of casterable wheels rotatably secured to the front of said basket frame;
   (d) A pair of rear wheels rotatably secured to the rear of said basket frame;
   (e) A tiltable trailer operatively associated with said basket frame for transportating a passenger wherein said tiltable trailer comprises a drive wheel carrier and a pivotable and tiltable passenger carrying platform operatively associated therewith and wherein said pivotable and tiltable passenger carrying platform further comprises a rubber friction brake mounted at the rear thereof for engaging the ground when said passenger shifts his weight rearward on said passenger carrying platform;
   (f) A pair of drive wheels rotatably mounted on said trailer for alternately engaging or disengaging the ground when said tiltable passenger carrying platform is tilted forward or rearward by movement of said passenger forward or rearward on said tiltable passenger carrying platform;
   (g) Drive means mounted on said trailer and operatively associated with said drive wheels for rotating said drive wheels when they engage the ground thereby propelling the cart-trailer vehicle along the ground;
   (h) A pair of wheels rotatably mounted toward the rear of said trailer to allow the trailer to traverse the ground; and,
   (i) A plurality of springs operatively associated at one end with said tiltable trailer and at their other end with said basket frame for urging said trailer and said drive wheels out of ground engagement when said passenger to be transported shifts his weight rearward on said passenger carrying platform.

2. The shopping cart-trailer vehicle of claim 1 wherein said pivotable passenger carrying platform further comprises an eye for engaging a hook associated with said shopping cart basket frame for stowing said trailer. when it is desired to push said shopping cart-trailer vehicle in a manual mode.

3. The shopping cart-trailer vehicle of claim 2 wherein said tiltable trailer pivots in a horizontal plane about a vertical pivot point.

4. The shopping cart-trailer vehicle of claim 3 further comprising a push bar forming part of said basket frame whereby said cart-trailer vehicle can be steered by said passenger.

5. The shopping-cart trailer vehicle of claim 4, wherein said drive means comprises an electric motor having a shaft, a pulley attached to said shaft and a belt operatively associated with said pulley and said drive wheels for rotating said drive wheels when said motor is actuated and when said drive wheels engage the ground when said passenger to be transported shifts his weight forward on said passenger carrying platform.

* * * * *